US008291220B2

(12) United States Patent
Singh (10) Patent No.: US 8,291,220 B2
(45) Date of Patent: *Oct. 16, 2012

(54) SECURING WIRELESS BODY SENSOR NETWORKS USING PHYSIOLOGICAL VALUES FOR NONCES

(75) Inventor: Kalvinder Pal Singh, Gold Coast City (AU)

(73) Assignee: International Business Machines Corporation, Armonk, NY (US)

( * ) Notice: Subject to any disclaimer, the term of this patent is extended or adjusted under 35 U.S.C. 154(b) by 960 days.

This patent is subject to a terminal disclaimer.

(21) Appl. No.: 12/109,965

(22) Filed: Apr. 25, 2008

(65) Prior Publication Data

US 2009/0271622 A1     Oct. 29, 2009

(51) Int. Cl.
*G06F 21/00* (2006.01)
(52) U.S. Cl. ........................................................ 713/168
(58) Field of Classification Search .................. 713/168, 713/169; 726/2
See application file for complete search history.

(56) References Cited

U.S. PATENT DOCUMENTS

| 7,206,649 B2 * | 4/2007 | Kirovski et al. ................. 700/94 |
| 2004/0049676 A1 * | 3/2004 | Dutertre et al. ............... 713/163 |
| 2007/0036355 A1 | 2/2007 | Terauchi et al. |
| 2008/0209545 A1 * | 8/2008 | Asano ............................ 726/19 |

OTHER PUBLICATIONS

Malasri et al., "Addressing Security in Medical Sensor Networks", HealthNet'07, Jun. 2007, San Juan, Puerto Rico, ACM, 2007, pp. 1-6.
Venkatasubramanian, "Secure Cluster Formation in BSN Using Physiological Values", 2007, pp. 1-19 http://impact.asu.edu/~mcn/cse591sp07/Final_presentations/Krishna_Final_Presentation.ppt.
Shudi et al., "Authenticated Symmetric-Key Establishment for Medical Body Sensor Networks", Journal of Electronics (China), vol. 24, No. 3, May 2007, pp. 421-427.
Asokan, "Initializing Security Associations for Personal Devices", Nokia Research Center, ZISC Workshop on Wireless Security, Sep. 2007, Helsinki Finland pp. 1-89 http://asokan.org/asokan/research/zisc-tut.pdf.

* cited by examiner

*Primary Examiner* — Jeffrey Pwu
*Assistant Examiner* — Anthony Brown
(74) *Attorney, Agent, or Firm* — Yee & Associates, P.C.; John D. Flynn (57) ABSTRACT

A key establishment protocol for securing wireless body sensor networks using environmental data for nonce values. To establish a secure communication between sensors in a sensor network using environmental data, the protocol measures a first environmental value at a first sensor and a trusted third party. A second environmental value is measured at a second sensor and the trusted third party. The trusted third party then sends to the second sensor a first authentication construct comprising the second environmental value, wherein the second environmental value is used by the second sensor to prevent replay attacks of messages between the trusted third party and second sensor. The trusted third party also sends to the first sensor a second authentication construct comprising the first environmental value, wherein the first environmental value is used by the first sensor to prevent replay attacks of messages between the trusted third party and first sensor.

30 Claims, 4 Drawing Sheets

SECURING WIRELESS BODY SENSOR NETWORKS USING PHYSIOLOGICAL VALUES FOR NONCES

BACKGROUND OF THE INVENTION

1. Field of the Invention

The present invention relates generally to computer and communications networks, and more specifically to securing wireless body sensor networks using environmental data for nonce values in a key establishment protocol.

2. Description of the Related Art

Sensor networks comprise a category of computer networks, characterized by the development of small, low cost sensor devices with combined sensing and communication (often wireless) capabilities. Most applications of sensor networks rely on combining information from multiple sensor devices to establish or infer some composite state or event of the sensed environment (often called the "sensing field"). The sensor devices are typically spread across a geographic area and contain some level of intelligence for signal processing and networking of the data. A sensor device may detect and monitor the value of some parameter at a given location, such as, for example, temperature, atmospheric pressure, relative humidity, etc.

One type of sensor network is a body sensor network. Body sensor networks typically comprise sensor devices, or sensor nodes, that are worn on or implanted within the body for measuring physiological data (vital signs, motion), combined with wireless components that wirelessly transmit the measured data to an external receiver, thus allowing continuous monitoring of patients in an unobtrusive manner in any environment. Each sensor node in a network may measure one or more types of a user's physiological data.

Devices within a body sensor network must be able to communicate with one another in a secure manner to ensure a user's privacy. To facilitate secure communication, data transfers between devices in the network are encrypted using either software or hardware techniques, such as key establishment protocols. However, wearable sensor nodes introduce a new set of technical problems due to resource limitations of the sensors. In a wireless body sensor network, sensors typically comprise small memories, weak processors, limited energy, and small packet size. In addition, sensors placed on or implanted within the body have no user interface, and may exist for long periods of time. The limitations of the sensors require that sensor networks be designed with extreme power conservation. As sensor nodes have little computational power, cryptographic ciphers must be used with care.

BRIEF SUMMARY OF THE INVENTION

Embodiments of the present invention relate to securing wireless body sensor networks using environmental data for nonce values in a key establishment protocol. To establish a secure communication between sensors in a sensor network using environmental data, the key establishment protocol measures a first environmental value at a first sensor and a trusted third party. A second environmental value is measured at a second sensor and the trusted third party. The trusted third party then sends to the second sensor a first authentication construct comprising the second environmental value, wherein the second environmental value is used by the second sensor to prevent replay attacks of messages between the trusted third party and the second sensor. The trusted third party also sends to the first sensor a second authentication construct comprising the first environmental value, wherein the first environmental value is used by the first sensor to prevent replay attacks of messages between the trusted third party and the first sensor.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Secure communication in a sensor network may be implemented using key establishment protocols. A protocol is a multi-party algorithm, defined by a sequence of steps specifying the actions required of two or more parties in order to achieve a specified objective. A key establishment protocol is a protocol whereby a shared secret becomes available to two or more parties, for subsequent cryptographic applications. Cryptography is the scrambling of information such that the information can only be unscrambled by an entity that holds the appropriate unscrambling key. By exchanging messages which can only be decrypted by those with access to the proper key, cryptographic protocols can be used as a means to authenticate entities. Asymmetric cryptography is often unsuitable for most sensor networks due to higher computational overhead, and energy and memory consumption. When using symmetric key cryptography to establish communication between two sensor devices in a sensor network, the key establishment protocols in wireless sensor networks may be sorted into main categories: pair-wise schemes, random key pre-distribution schemes, and Key Distribution Center (KDC). Key establishment protocols are used to set up shared secrets between sensor nodes. A pair-wise scheme is a protocol in which each node in a network shares a unique pairwise key with every other node in the network. A random key pre-distribution scheme relies on a random graph which is connected with high probability if the average degree of the network nodes is above a threshold. A Key Distribution Center (KDC) is a protocol where when two entities sharing no previous secret want to communicate securely with each other, they do so with the assistance of a third party, which has an existing shared key between both entities.

A new fourth category for providing secure communication between sensors comprises key establishment protocols which use environmental values to establish symmetric keys. These environmental values may comprise physiological values of individuals which have been measured using sensors in a body sensor network. This physiological data may include inter-pulse interval (IPI) and heart rate variance (HRV). A physiological value measured for an individual can provide a cryptographically random number used to encrypt a new symmetric key between a sensor pair.

For example, to initiate a key establishment protocol between a pair of sensor nodes, the first sensor in the pair generates a new session key and a nonce. The new key is used as the shared secret between the sensor pair. A nonce may be a randomly generated value or a counter value used by the receiving sensor node to confirm that the data is fresh and is not a "replay" of earlier data. A replay attack is a form of network attack in which a valid data transmission is maliciously or fraudulently repeated or delayed. The replay adversary may intercept and retransmit data, masquerading as one of the nodes to trick the receiver into unauthorized operations such as false identification or authentication or a duplicate transaction. To prevent replay attacks, nonces are sent in messages from the first sensor to initiate a key establishment protocol. An exemplary key establishment protocol for sending, from node A to neighboring sensor node B, a single message comprising a new key is shown below:

$$A \rightarrow B: N_A, [N_A]_{RANDKEY}, RANDKEY \oplus SEV,$$

where A and B are the two nodes who wish to share a new session key (RANDKEY), $N_A$ is a nonce generated by node A, and RANDKEY$\oplus$SEV is an exclusive-or operation comprising a concatenation of data strings RANDKEY and SEV. SEV is a secure environmental value which comprises physiological data measured by a sensor in the network.

The first sensor (node A) encrypts its generated nonce using the new key, RANDKEY. As nonce $N_A$ was randomly generated by the first sensor node, replay attacks may be defeated because the replayer cannot know in advance the nonce the first sensor will generate. The new key is then encrypted with the sensor-measured physiological value, or secure environmental value (SEV), which is measured by and known only to each of the sensors placed on a particular person. Upon receiving the message, the receiving sensor (node B) may decrypt the new key using the secure environmental value and validate that the new key is correct by verifying the message authentication code (MAC) of the nonce.

A problem with existing key establishment protocols that employ physiological values in this manner is that the existing protocols require all of the sensor nodes in a network be able to measure the same phenomenon in order to provide secure communication. Using the heart rate variance (HRV) as an example, all of the sensor nodes on the body would have to measure this heart rate variance phenomenon. Thus, a receiving sensor node would be able to measure the heart rate variance that the first sensor used to encrypt the new key. To ensure secure communications between nodes in the network, only cryptographically strong physiological values should be measured and used as SEVs. A cryptographically strong physiological value is a value from sensed data in the environment that can be obtained by the sensors and is difficult to obtain through any other means. However, developing technology (e.g., ultra wideband (UWB) and radar) may be used to remotely capture the heart rate and may cause security risks when using only SEVs such as inter-pulse interval and heart rate variance to secure the communication. Physiological values such as blood pressure or iron count are less susceptible to those remote attacks; however, these values are cryptographically weaker physiological values, thus providing limited security. Furthermore, the use of PIN code or a password is not applicable to body sensor networks, since many of the sensors do not have a user-interface.

The illustrative embodiments address the problems present in existing key establishment protocols by proposing a new protocol for securing sensor networks using environmental data for nonce values. While nonces are traditionally used in key establishment protocols to authenticate protocol messages in order to stop replay attacks, sending nonces in the protocol adds extra overhead to the messages, and in many cases adds extra messages to the protocols. Instead of sending traditional nonces comprising random numbers or counter values in a message between sensor nodes for verifying the validity of a message, the new key establishment protocol in the illustrative embodiments uses shared environmental values (EV data) as the nonce values. An environmental value comprises a data value measured by sensors placed in a particular environment. In one embodiment, a environmental value may comprise physiological data. For example, the environmental values may include physiological data measured from a human body environment. These environmental values may also include measurements taken from other animate objects (e.g., animals, etc.), as well as inanimate objects or other environments. Unlike cryptographically strong secure environmental values (SEVs), an EV is a physiological value that is not required to be secret. In the illustrative embodiments, the EV is not sent out in the clear. However, even if an adversary knew the value of the EV, since the EV is being used as a nonce, the protocol is still secure. As the sensors measure the environmental data and use the environmental values as nonces, the need to send nonces over the communication medium is removed.

With the protocol provided in the illustrative embodiments, two sensor nodes are not required to measure the same environmental data. Rather, a third party which measures the same environmental values as the other two sensor nodes is used to translate protocol messages between the two sensor nodes. In addition, with the illustrative embodiments, the environmental data used for the nonce values is not required to be cryptographically strong. In a secure protocol, nonces are not required to be secret and may be "sent in the clear". Thus, anyone eavesdropping on the protocol may know the nonce, but the protocol is still secure. Since the environmental values are being used as nonces, the environmental values used in the protocol do not need to be cryptographically strong.

Figure 1:
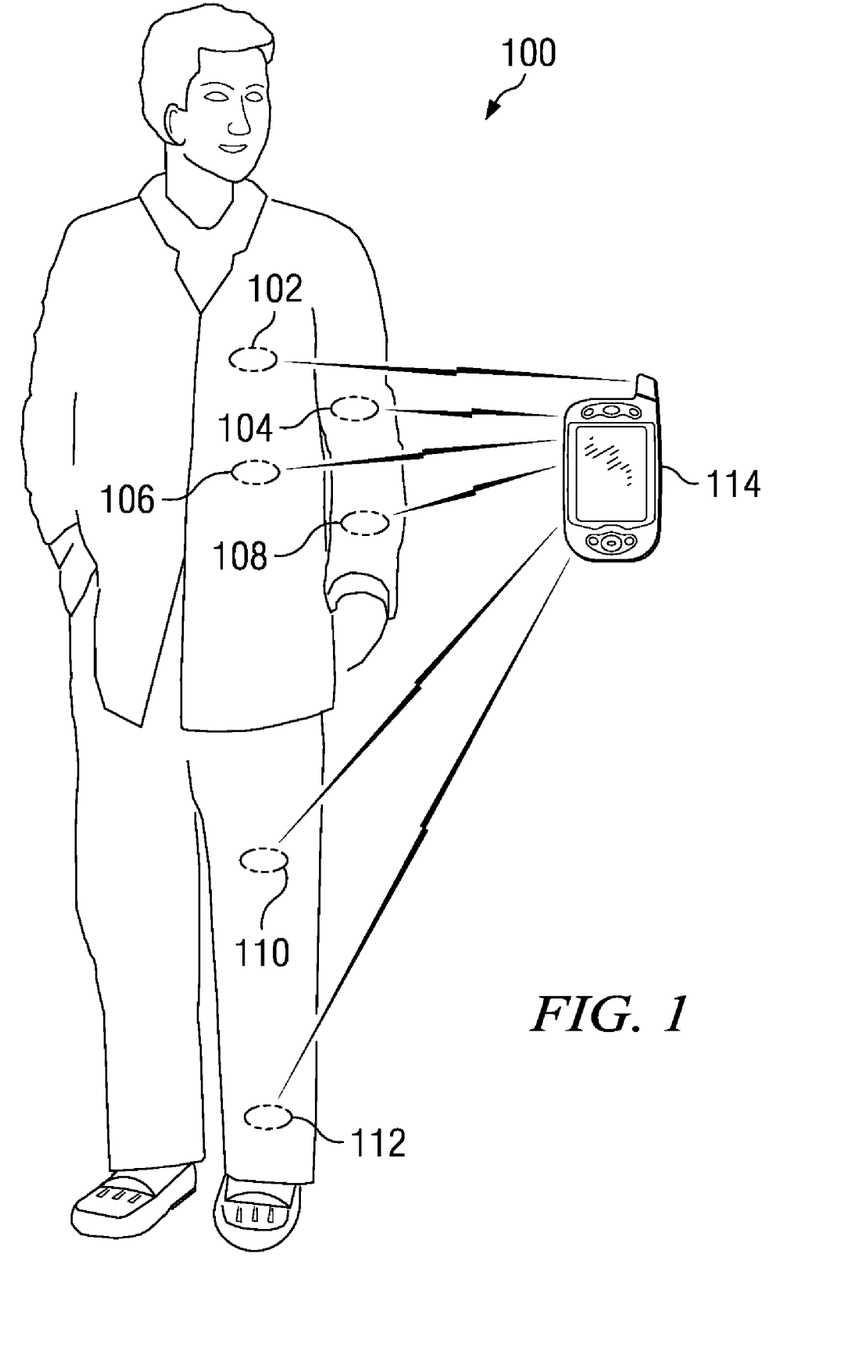
FIG. 1 is a pictorial representation of an exemplary wireless body sensor network in which the illustrative embodiments may be implemented.

Turning now to FIG. 1, a pictorial representation of an exemplary wireless body sensor network in which the illustrative embodiments may be implemented is shown. In this illustrative example, wireless body sensor network 100 includes a plurality of body-worn sensor nodes 102-112 and personal server 114. Depending upon the particular implementation, sensor nodes 102-112 may comprise patches or devices worn on the user's skin or incorporated in the user's shoes or clothing. Sensor nodes 102-112 may also comprise implanted devices within the user's body.

Sensor nodes 102-112 monitor environmental data about the user. In particular, each sensor node is capable of collecting, processing, and communicating physiological data about the user to personal server 114, and may be in use for extended periods of time. This physiological data may include, but is not limited to, inter-pulse interval (IPI) and heart rate variance (HRV). Each sensor node may be configured to measure one or more types of physiological data. Two or more of sensor nodes 102-112 may also be configured to measure the same type of physiological data. Each sensor node may transmit messages wirelessly to other sensor nodes through body sensor network 100.

Personal server 114 comprises a data processing system external to the user's body which controls wireless body sensor network 100. Personal server 114 may be implemented on a personal computer, laptop, personal digital assistant (PDA), cell phone, etc. Personal server 114 receives collected physiological data from sensor nodes 102-112 on the user through wireless body sensor network 100. Upon collecting the physiological data, personal server 114 may process the data and send this user information wirelessly through the Internet or a mobile telephone network to a medical information or hospital system (not shown).

Figure 2:
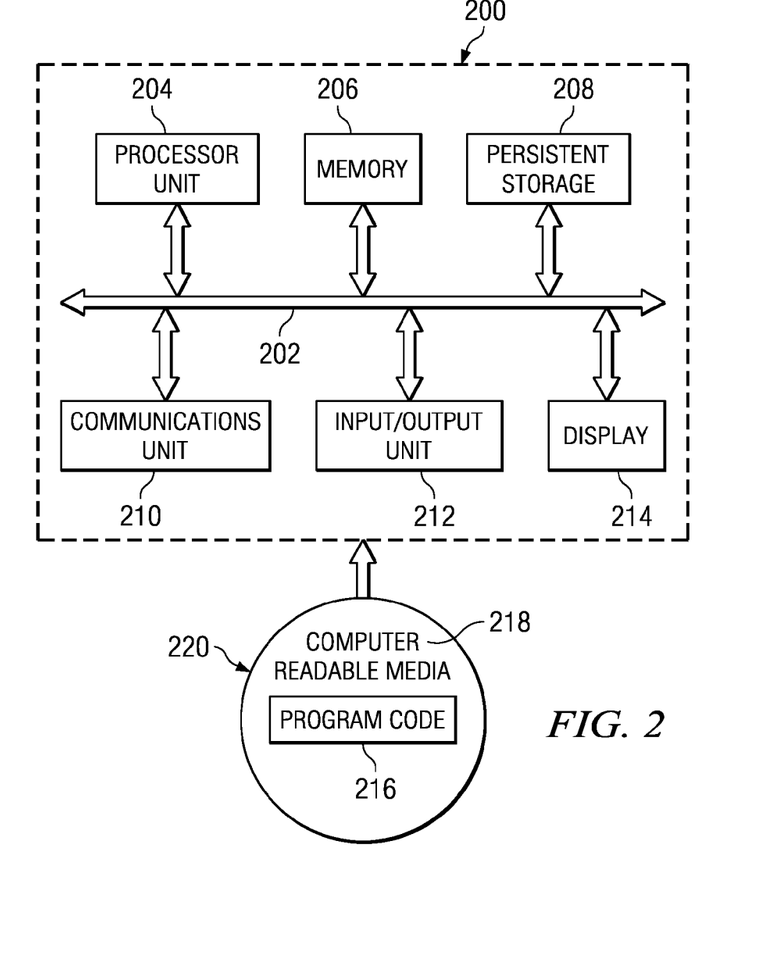
FIG. 2 is a block diagram of a data processing system with which the illustrative embodiments may be implemented.

FIG. 2 is a diagram of a data processing system in accordance with an illustrative embodiment of the present invention. Data processing system 200 is an example of personal server 114 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
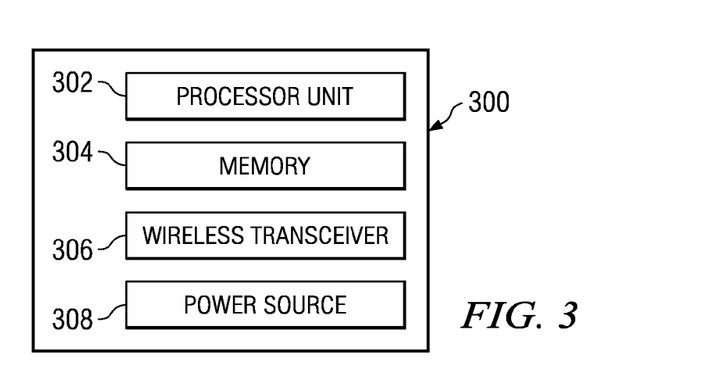
FIG. 3 is a block diagram of an exemplary sensor device with which the illustrative embodiments may be implemented.

FIG. 3 is a block diagram of an exemplary sensor device with which the illustrative embodiments may be implemented. Sensor device 300 is an example of sensor devices 102-114 in FIG. 1. In this illustrative example, sensor device 300 includes processor unit 302, memory 304, wireless transceiver 306, and power source 308. The components illustrated for sensor device 300 are not meant to provide architectural limitations to the manner in which different embodiments may be implemented. Other components shown in FIG. 3 can be varied from the illustrative examples shown.

Processor unit 302 executes instructions for software that may be loaded into memory 304. Memory 304, in these examples, may be, for example, a random access memory or any other suitable volatile or non-volatile storage device. Processor unit 302 may also receive wireless transmissions from other sensor devices in the body sensor network or from an external device such as personal server 114 in FIG. 1. These wireless transmissions may include instructions for monitoring and collecting physiological data, the physiological data collected by the sensor, and messages to initiate key establishment protocols for secure communication between the devices.

Wireless transceiver 306 provides for communications with other data processing systems or sensor nodes. Wireless transceiver 306 may provide communications through the use of wireless technology such as, for example, a Bluetooth™ connection. Power source 308 provides an energy source for operation of sensor device 300. In these examples, power source 308 may comprise a battery.

Figure 4:
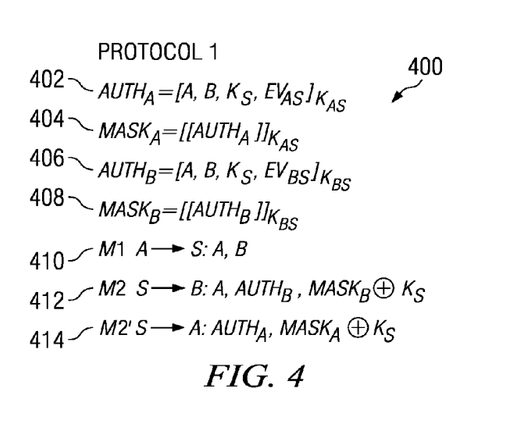
FIG. 4 illustrates an exemplary key establishment protocol which uses environmental data as nonce values in accordance with the illustrative embodiments.

FIG. 4 illustrates an exemplary key establishment protocol which uses environmental data as nonce values in accordance with the illustrative embodiments. When using symmetric key cryptography, if two entities sharing no previous secret want to communicate securely with each other, they generally do so with the assistance of a third party. In wireless sensor networks, the two entities are typically resource-constrained sensor nodes, such as sensor nodes 102-112 in FIG. 1, and the third party is a resource-heavy base station, such as personal server 114 also in FIG. 1. Typically, the base station provides an authentication service that distributes a secure session key to the sensor nodes. The base station is sometimes referred to as a trusted third party, since every client has to trust it by sharing a secret with it. Many applications using wireless sensor networks do not require encryption, but do require authenticated messages. However, key establishment protocols require encryption to safely transport a new session key between the nodes. A trusted third party may comprise any software and/or hardware component that measures the same environmental values as the two sensor nodes that want to communicate securely and translates protocol messages between these two sensor nodes. In one embodiment, the trusted third party is another sensor node in the sensor network, such as sensor nodes 102-112 in FIG. 1. In another embodiment, the trusted third party is a base station device, such as personal server 114 also in FIG. 1.

In proposed protocol 400 in FIG. 4, shared environmental values are used in place of traditional nonce values. The authentication construct 402 and mask construct 404 used for sensor node A are as follows: $AUTH_A=[A, B, K_S, EV_{AS}]_{K_{AS}}$ and $MASK_A=[[AUTH_A]]_{K_{AS}}$. Similar constructs 406 and 408 are created for sensor node B. The authentication constructs are used to authenticate and identify the other sensor. The masks may either be created from an encryption algorithm or from a message authentication code (MAC). In the authentication and mask constructs, the symbols A and B identify the communicating sensor nodes. $K_{AS}$ and $K_{BS}$ are a long term session keys initially shared by sensor A and server S for centralized authentication. $K_S$ is a random key created by server S.

Symbol $EV_{AS}$ is a shared environmental value (EV) between sensor A and server S. This environmental value may comprise physiological data measured by both sensor A and server S. Likewise, symbol $EV_{BS}$ is a shared EV between the sensor B and server S. This environmental value may also comprise physiological data measured by both sensor B and server S. The constructs $AUTH_A$ and $AUTH_B$ are designed so that different physiological phenomena may be used between A and S, and B and S. Thus, $EV_{AS}$ and $EV_{BS}$ may comprise different values measured from different physiological phenomena. However, it should also be noted that there is no requirement that $EV_{AS}$ and $EV_{BS}$ cannot comprise the same measured phenomena.

In message M1 410, sensor node A sends a message to server S. Message M1 410 comprises the addresses or locations of the communicating sensor nodes A and B. Message 2 has been split into two messages—M2 and M2'. These messages may be sent at the same time. In message M2 412, server S sends a message to sensor node B. Server S creates the authentication and mask constructs $AUTH_B$, and $MASK_B$ which comprise an environmental value $EV_{BS}$ measurable by both server S and sensor node B. Server S sends $AUTH_B$, and $MASK_B$ with the location of sensor node A.

In message M2' 414, server S also sends a message to sensor node A. Server S creates the authentication and mask constructs $AUTH_A$ and $MASK_A$ which comprise an environmental value $EV_{AS}$ measurable by both server S and sensor node A. Server S sends $AUTH_A$ and $MASK_A$ to sensor node A.

The security of proposed protocol 400 relies on the randomness of the environmental values. For instance, sensor node A and server S both share $EV_{AS}$ and $K_{AS}$. As long as $EV_{AS}$ is a random value (e.g., heart rate variance or inter-pulse interval in the body), an adversary cannot replay $AUTH_A$ when protocol 400 is rerun. Similarly, as long as $EV_{BS}$ is a random value, $AUTH_B$ also cannot be replayed when protocol 400 is rerun. If $EV_{AS}$ has n-bits of randomness, then according to the birthday paradox, probabilistically the first repetition for $EV_{AS}$ will occur after roughly 2n/2 runs of the protocol. The same applies for $EV_{BS}$. However, if the environmental values can also be considered to be secure environmental values (SEVs), then the adversary will not be able to know when the environmental value has repeated.

In addition, environmental data may also be used to update session keys after protocol 400 in FIG. 4 is run. In one embodiment, sensor node A and sensor node B are assumed to be able to measure the same environmental phenomenon. In this particular situation, a new session key may be generated between sensor nodes A and B using the following equation: $K_{AB}=[EV_{AB}]_{K_S}$. However, if the sensors cannot read the same environmental data, then a counter may be used in place of $EV_{AB}$, or nonces will need to be sent between the sensors.

Figure 5:
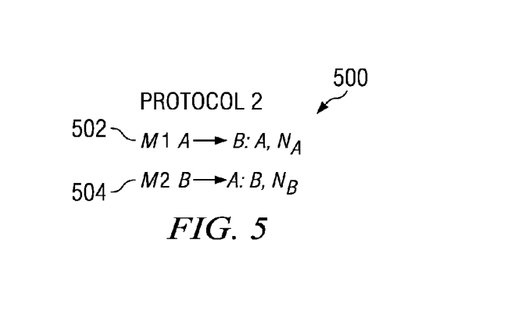
FIG. 5 illustrates a protocol in which nonces comprising environmental data may be used to update session keys in accordance with the illustrative embodiments.

FIG. 5 illustrates a protocol in which nonces comprising environmental data may be used to update session keys in accordance with the illustrative embodiments. In this illustrative example, the Boyd two-pass protocol 500 is used to create the session key when using protocol 400 in FIG. 4. The Boyd two-pass protocol contains a total of two messages.

In message 1 502, sensor node A sends a message to sensor node B. Message 1 502 comprises the location of sensor node A and nonce value $N_A$. Nonce value $N_A$ may comprise an environmental value measured by sensor node A. In message 2 504, sensor node B sends a message to sensor node A. Message 2 504 comprises the location of sensor node B and nonce value $N_B$. Nonce value $N_B$ may comprise an environmental value measured by sensor node B.

By using Boyd two-pass protocol 500, both sensor node A and B may supply to one another the information needed to generate a session key $K_{AB}$. Session key $K_{AB}$ may be calculated using the following equation: $K_{AB}=[N_A, N_B]_{K_S}$.

Figure 6:
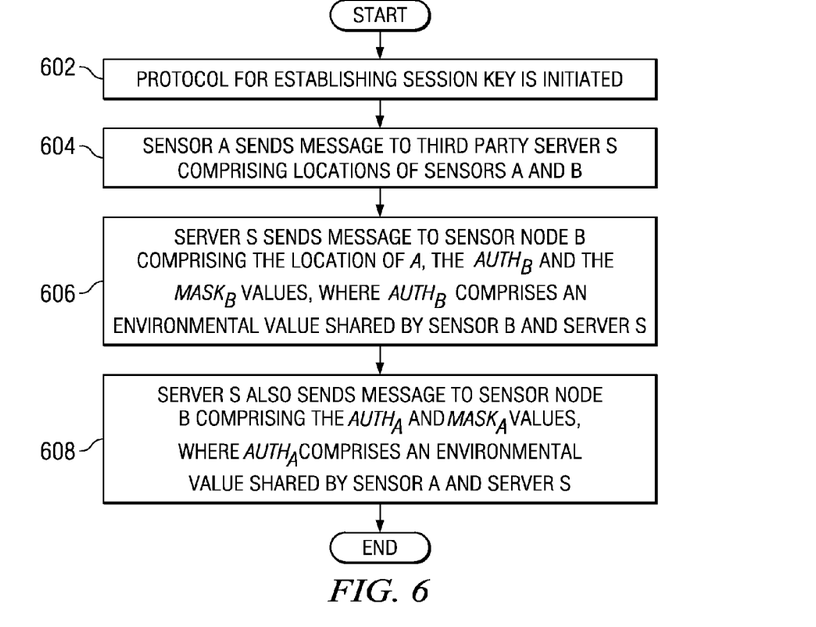
FIG. 6 is a flowchart of a process for establishing keys between sensors and calculating nonces from physiological data to secure communications in a wireless body sensor network in accordance with the illustrative embodiments.

FIG. 6 is a flowchart of a process for establishing keys between sensors and calculating nonces from physiological data to secure communications in a wireless body sensor network in accordance with the illustrative embodiments. The process described in FIG. 6 may be implemented in a sensor network such as wireless body sensor network 100 in FIG. 1. The process may be used to establish secure communications between two sensors in the wireless body sensor network.

The process begins when two sensor nodes in the body sensor network initiate execution of a protocol to communicate securely with one another (step 602). In executing the protocol, sensor A sends a message to a third party server S comprising the values A, B, and $N_A$ (step 604). The A and B values comprise addresses or locations of the communicating sensor nodes A and B. $N_A$ comprises an environmental value measured by sensor node A.

Upon receiving the message, server S sends a message to sensor node B comprising the values A, $N_A$, $AUTH_B$, $MASK_B$ concatenated with a key ($K_s$) generated by server S (step 606). Server S creates the authentication and mask constructs $AUTH_B$, and $MASK_B$ which comprise a shared environmental value $EV_{BS}$. This shared environmental value comprises physiological data measurable by both the sensor node B and third party server S. Server S also sends a message to sensor node B comprising the values $AUTH_A$ and $MASK_A$ concatenated with key $K_s$ (step 608). Server S also creates the authentication and mask constructs $AUTH_A$, and $MASK_A$ which comprise a shared environmental value $EV_{AS}$. This shared environmental value comprises physiological data measurable by both the sensor node A and third party server S. Environmental values $EV_{BS}$ and $EV_{AS}$ may be the same value (i.e., the same physiological phenomenon is measured between sensor A-server S and between sensor B-server S) or different values (i.e., different physiological phenomenon is measured between sensor A and server S and between sensor B and server S).

Figure 7:
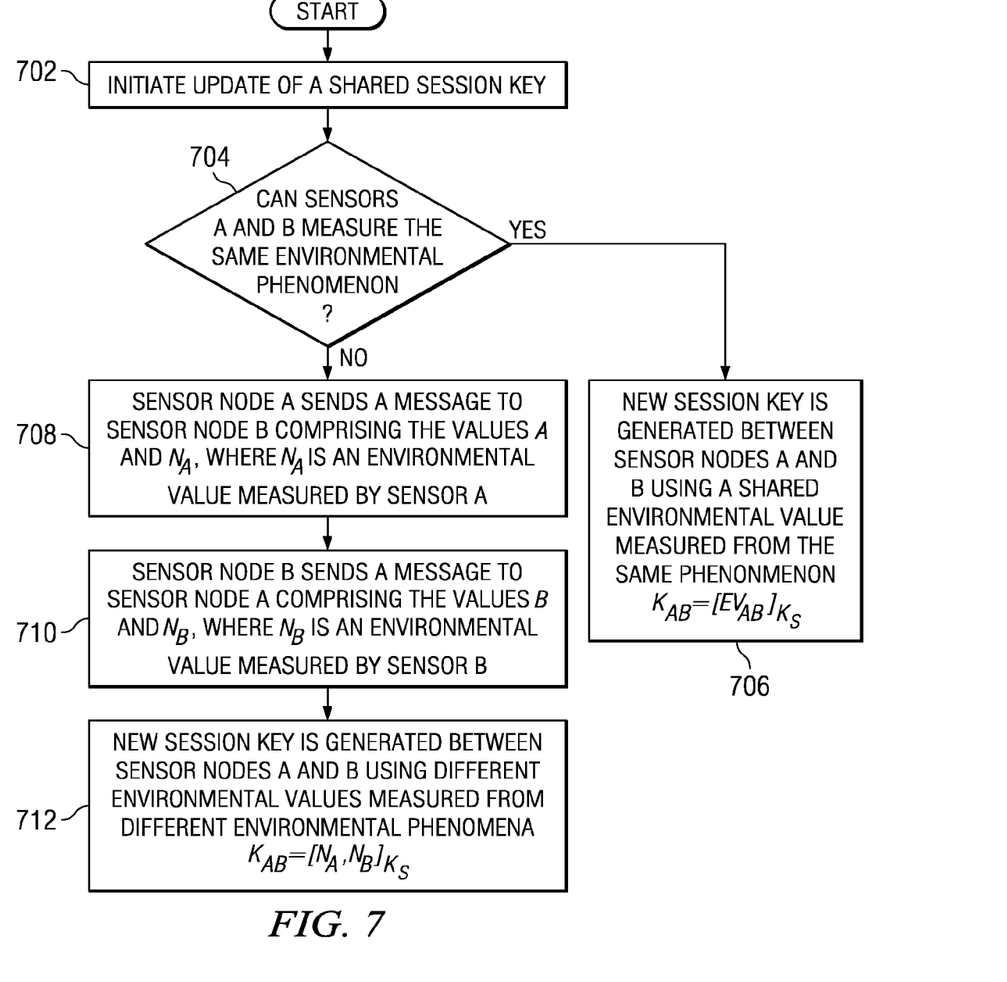
FIG. 7 is a flowchart of a process for updating session keys using environmental data in accordance with the illustrative embodiments.

FIG. 7 is a flowchart of a process for updating session keys using environmental data in accordance with the illustrative embodiments. The process described in FIG. 7 may be implemented in a sensor network such as wireless body sensor network 100 in FIG. 1.

The process begins when two sensor nodes in the body sensor network initiate the update of a shared session key to communicate securely with one another (step 702). A determination is made as to whether the two sensor nodes are able to measure the same environmental phenomenon (step 704). If the sensor nodes are able to measure the same environmental phenomenon ('yes' output of step 704), a new session key is generated between sensor nodes A and B using the following equation: $K_{AB}=[EV_{AB}]_{K_S}$ (step 706).

Turning back to step 704, if the sensor nodes cannot read the same environmental data ('no' output of step 704), sensor node A sends a message to sensor node B comprising the values A and $N_A$ (step 708). The A value comprises the location of sensor node A, and the $N_A$ value comprises a traditional counter nonce or an environmental value measured by sensor node A.

Upon receiving the message, sensor node B sends a message to sensor node A comprising the values B and $N_B$ (step 710). The B value comprises the location of sensor node B, and the $N_B$ value comprises a traditional counter nonce or an environmental value measured by sensor node B. Thus, each sensor node has supplied the other with information needed to establish a new shared session key $K_{AB}$ between sensor nodes A and B. Each sensor node may now calculate a new session key $K_{AB}$ using the following equation: $K_{AB}[N_A, N_B]_{K_s}$ (step 712).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for establishing a secure communication between sensors in a sensor network using environmental data, the computer implemented method comprising:

measuring, by a first sensor and by a trusted third party, a first environmental value;

measuring, by a second sensor and by the trusted third party, a second environmental value;

sending, from the trusted third party to the second sensor, a first authentication construct, wherein the first authentication construct comprises the second environmental value, and wherein the second sensor uses the second environmental value to prevent replay attacks of messages between the trusted third party and the second sensor; and sending, from the trusted third party to the first sensor, a second authentication construct comprising the first environmental value, wherein the first sensor uses the first environmental value to prevent replay attacks of messages between the trusted third party and the first sensor.

2. The computer implemented method of claim 1, further comprising:
receiving, at the trusted third party, a first message from the first sensor, comprising a location of the first sensor and a location of the second sensor;
sending, from the trusted third party to the second sensor, a second message comprising the location of the first sensor, the first authentication construct and a first mask; and
sending, from the trusted third party to the first sensor, a third message comprising the second authentication construct and a second mask.

3. The computer implemented method of claim 1, wherein the first authentication construct comprises a location of the first sensor, a location of the second sensor, a key created by the trusted third party, and the second environmental value, wherein a first mask comprises the first authentication construct, and wherein the first authentication construct and the first mask are encrypted with a session key shared between the trusted third party and the second sensor.

4. The computer implemented method of claim 1, wherein the second authentication construct comprises a location of the first sensor, a location of the second sensor, a key created by the trusted third party, and the first environmental value, wherein a second mask comprises the second authentication construct, and wherein the second authentication construct and the second mask are encrypted with a session key shared between the trusted third party and the first sensor.

5. The computer implemented method of claim 1, wherein the sensor network comprises a wireless body sensor network.

6. The computer implemented method of claim 1, wherein the first environmental value and the second environmental value comprise physiological data collected from sensors placed in proximity to or within a human body.

7. The computer implemented method of claim 6, wherein the physiological data comprises cryptographically weak values.

8. The computer implemented method of claim 6, wherein the physiological data comprises one of inter-pulse interval or heart rate variance values.

9. The computer implemented method of claim 1, wherein the first environmental value is measured from a same environmental phenomenon as the second environmental value.

10. The computer implemented method of claim 1, wherein the first environmental value is measured from a different environmental phenomenon as the second environmental value.

11. A computer implemented apparatus for establishing a secure communication between sensors in a sensor network using environmental data, comprising:
a first sensor which measures a first environmental value;
a second sensor which measures a second environmental value; and
a trusted third party which measures the first environmental value and the second environmental value;
wherein the first sensor, second sensor, and the trusted third party are coupled to form the sensor network;
wherein the trusted third party sends a first authentication construct to the second sensor, wherein the first authentication construct comprises the second environmental value;
wherein the second sensor uses the second environmental value to prevent replay attacks of messages between the trusted third party and the second sensor;
wherein the trusted third party sends a second authentication construct to the first sensor comprising the first environmental value; and
wherein the first sensor uses the first environmental value to prevent replay attacks of messages between the trusted third party and the first sensor.

12. The computer implemented apparatus of claim 11, further comprising:
wherein the first sensor sends a first message to the trusted third party comprising a location of the first sensor and a location of the second sensor;
wherein the trusted third party sends a second message to the second sensor comprising the location of the first sensor, the first authentication construct and a first mask; and
wherein the trusted third party sends a third message to the first sensor comprising the second authentication construct and a second mask.

13. The computer implemented apparatus of claim 11, wherein the first authentication construct comprises a location of the first sensor, a location of the second sensor, a key created by the trusted third party, and the second environmental value, wherein a first mask comprises the first authentication construct, and wherein the first authentication construct and the first mask are encrypted with a session key shared between the trusted third party and the second sensor.

14. The computer implemented apparatus of claim 11, wherein the second authentication construct comprises a location of the first sensor, a location of the second sensor, a key created by the trusted third party, and the first environmental value, wherein a second mask comprises the second authentication construct, and wherein the second authentication construct and the second mask are encrypted with a session key shared between the trusted third party and the first sensor.

15. The computer implemented apparatus of claim 11, wherein the sensor network comprises a wireless body sensor network.

16. The computer implemented apparatus of claim 11, wherein the first environmental value and the second environmental value comprise physiological data collected from the first sensor and the second sensor.

17. The computer implemented apparatus of claim 16, wherein the physiological data comprises cryptographically weak values.

18. The computer implemented apparatus of claim 16, wherein the physiological data comprises one of inter-pulse interval or heart rate variance values.

19. The computer implemented apparatus of claim 11, wherein the first environmental value is measured from a same environmental phenomenon as the second environmental value.

20. The computer implemented apparatus of claim 11, wherein the first environmental value is measured from a different environmental phenomenon as the second environmental value.

21. A computer program product for establishing a secure communication between sensors in a sensor network using environmental data, the computer program product comprising:

a computer usable storage device having computer usable program code tangibly embodied thereon, the computer usable program code comprising:

computer usable program code for measuring, by a first sensor and by a trusted third party, a first environmental value;

computer usable program code for measuring, by a second sensor and by the trusted third party, a second environmental value;

computer usable program code for sending, from the trusted third party to the second sensor, a first authentication construct, wherein the first authentication construct comprises the second environmental value, and wherein the second sensor uses the second environmental value to prevent replay attacks of messages between the trusted third party and the second sensor; and computer usable program code for sending, from the trusted third party to the first sensor, a second authentication construct comprising the first environmental value, wherein the first sensor uses the first environmental value to prevent replay attacks of messages between the trusted third party and the first sensor.

22. The computer program product of claim 21, further comprising:

computer usable program code for receiving, at the trusted third party, a first message from the first sensor, comprising a location of the first sensor and a location of the second sensor;

computer usable program code for sending, from the trusted third party to the second sensor, a second message comprising the location of the first sensor, the first authentication construct and a first mask; and computer usable program code for sending, from the trusted third party to the first sensor, a third message comprising the second authentication construct and a second mask.

23. The computer program product of claim 21, wherein the first authentication construct comprises a location of the first sensor, a location of the second sensor, a key created by the trusted third party, and the second environmental value, wherein a first mask comprises the first authentication construct, and wherein the first authentication construct and the first mask are encrypted with a session key shared between the trusted third party and the second sensor.

24. The computer program product of claim 21, wherein the second authentication construct comprises a location of the first sensor, a location of the second sensor, a key created by the trusted third party, and the first environmental value, wherein a second mask comprises the second authentication construct, and wherein the second authentication construct and the second mask are encrypted with a session key shared between the trusted third party and the first sensor.

25. The computer program product of claim 21, wherein the sensor network comprises a wireless body sensor network.

26. The computer program product of claim 21, wherein the first environmental value and the second environmental value comprise physiological data collected from sensors placed in proximity to or within a body.

27. The computer program product of claim 26, wherein the physiological data comprises cryptographically weak values.

28. The computer program product of claim 26, wherein the physiological data comprises one of inter-pulse interval or heart rate variance values.

29. The computer program product of claim 21, wherein the first environmental value is measured from a same environmental phenomenon as the second environmental value.

30. The computer program product of claim 21, wherein the first environmental value is measured from a different environmental phenomenon as the second environmental value.

* * * * *